United States Patent
Chao et al.

(10) Patent No.: US 10,212,721 B2
(45) Date of Patent: *Feb. 19, 2019

(54) TERMINATION OF WIRELESS COMMUNICATION UPLINK PERIODS TO FACILITATE RECEPTION OF OTHER WIRELESS COMMUNICATIONS

(71) Applicant: Marvell World Trade Ltd., St. Michael (BB)

(72) Inventors: Yi-Ling Chao, Sunnyvale, CA (US); Qing Zhao, Milipitas, CA (US); Leilei Song, Sunnyvale, CA (US); Hui-Ling Lou, Sunnyvale, CA (US); Yakun Sun, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,528

(22) Filed: Mar. 2, 2017

(65) Prior Publication Data

US 2017/0181181 A1 Jun. 22, 2017

Related U.S. Application Data

(63) Continuation of application No. 14/242,674, filed on Apr. 1, 2014, now Pat. No. 9,590,792.
(Continued)

(51) Int. Cl.
*H04W 72/12* (2009.01)
*H04L 5/00* (2006.01)
(Continued)

(52) U.S. Cl.
CPC ....... *H04W 72/1215* (2013.01); *H04L 1/1812* (2013.01); *H04L 1/1825* (2013.01);
(Continued)

(58) Field of Classification Search
CPC ... H04L 5/0078; H04L 5/0064; H04L 1/1854; H04W 16/10
See application file for complete search history.

(56) References Cited

U.S. PATENT DOCUMENTS 6,978,121 B1 12/2005 Lane
8,086,213 B1 12/2011 Wong et al.
(Continued)

FOREIGN PATENT DOCUMENTS

JP 2013535938 A1 9/2013
JP 2014504830 A1 2/2014
(Continued)

OTHER PUBLICATIONS

Golmie et al., "Interference of Bluetooth and IEEE 802.11: Simulation Modeling and Performance Evaluation", Networking for Pervasive Computing, NIST Special Publication 500-259, pp. 30-37.
(Continued)

*Primary Examiner* — Warner Wong (57) ABSTRACT

The present disclosure describes systems and techniques relating to wireless communications. A described system includes a first radio configured to wirelessly transmit to a first station in accordance with a first wireless communication technology via uplink periods that are scheduled by the first station; a second radio configured to wirelessly communicate with a second station in accordance with a second wireless communication technology; and a controller coupled with the first and second radios, the controller being configured to select for puncturing one or more of the uplink periods based on information about types of data to be transmitted respectively in the uplink periods, puncture, independently of the first station, the one or more selected uplink periods by causing the first radio to terminate transmissions to the first station during the selected uplink
(Continued)

period(s), and cause the second radio to receive data from the second station during the selected uplink period(s).

14 Claims, 4 Drawing Sheets

Related U.S. Application Data

(60) Provisional application No. 61/807,149, filed on Apr. 1, 2013.

(51) Int. Cl.
*H04L 1/18* (2006.01)
*H04W 88/06* (2009.01)
*H04L 5/14* (2006.01)

(52) U.S. Cl.
CPC .......... *H04L 1/1854* (2013.01); *H04L 1/1887* (2013.01); *H04L 5/0078* (2013.01); *H04L 5/14* (2013.01); *H04W 88/06* (2013.01)

(56) References Cited

U.S. PATENT DOCUMENTS

| | | | |
|---|---|---|---|
| 8,165,544 B2 | 4/2012 | Tran et al. | |
| 2004/0029619 A1 | 2/2004 | Liang | |
| 2005/0239497 A1* | 10/2005 | Bahl | H04L 12/5692 455/552.1 |
| 2006/0133334 A1 | 6/2006 | Ross | |
| 2006/0292986 A1 | 12/2006 | Bitran | |
| 2006/0292987 A1 | 12/2006 | Ophir | |
| 2007/0060055 A1 | 3/2007 | Desai | |
| 2007/0079085 A1 | 7/2007 | Terry et al. | |
| 2008/0130603 A1 | 6/2008 | Wentink | |
| 2008/0192806 A1 | 8/2008 | Wyper | |
| 2008/0198804 A1* | 8/2008 | Rahman | H04W 36/0011 370/331 |
| 2008/0279092 A1 | 11/2008 | Hassan et al. | |
| 2008/0279162 A1* | 11/2008 | Desai | H04W 72/1215 370/338 |
| 2009/0081962 A1 | 3/2009 | Sohrabi | |
| 2009/0082026 A1* | 3/2009 | Yavuz | H04W 52/243 455/446 |
| 2009/0137206 A1 | 5/2009 | Sherman | |
| 2009/0147763 A1 | 6/2009 | Desai | |
| 2009/0175175 A1 | 7/2009 | Somasundaram et al. | |
| 2009/0176454 A1 | 7/2009 | Chen | |
| 2009/0257379 A1 | 10/2009 | Robinson | |
| 2009/0285167 A1 | 11/2009 | Hirsch | |
| 2010/0054161 A1 | 3/2010 | Montojo | |
| 2010/0099449 A1* | 4/2010 | Borran | H04W 52/243 455/501 |
| 2010/0316027 A1 | 12/2010 | Rick | |
| 2011/0044243 A1 | 2/2011 | Yi et al. | |
| 2011/0190024 A1* | 8/2011 | Seong | H04L 1/0069 455/522 |
| 2011/0244869 A1 | 10/2011 | Olofsson | |
| 2011/0312358 A1* | 12/2011 | Barbieri | H04W 24/10 455/507 |
| 2012/0008555 A1* | 1/2012 | Zhang | H04L 1/0606 370/328 |
| 2012/0082077 A1 | 4/2012 | Zhang et al. | |
| 2012/0099458 A1* | 4/2012 | Ezaki | H04W 72/0406 370/252 |
| 2012/0164948 A1 | 6/2012 | Narasimha et al. | |
| 2012/0231836 A1 | 9/2012 | Kuo | |
| 2013/0003671 A1 | 1/2013 | Wang | |
| 2013/0070625 A1* | 3/2013 | Fujishima | H04W 36/20 370/252 |
| 2013/0260821 A1 | 10/2013 | Deparis | |
| 2013/0329821 A1 | 12/2013 | Chen | |
| 2014/0064098 A1 | 3/2014 | Choi et al. | |
| 2014/0120916 A1 | 5/2014 | Du | |
| 2014/0133410 A1* | 5/2014 | Nguyen | H04W 72/02 370/329 |
| 2015/0092573 A1 | 4/2015 | Zhang | |
| 2015/0092673 A1* | 4/2015 | Singh | H04W 28/0215 370/329 |

FOREIGN PATENT DOCUMENTS

| | | |
|---|---|---|
| JP | 2014506077 A1 | 3/2014 |
| WO | WO2012021879 A1 | 2/2012 |
| WO | WO2012096949 A1 | 7/2012 |
| WO | WO2012099939 | 7/2012 |

OTHER PUBLICATIONS

Golmie, "Interference in the 2.4 GHz ISM Band: Challenges and Solutions", Networking for Pervasive Computing, NIST Special Publication 500-259, pp. 48-60.
Golmie et al. "Interference Aware Bluetooth Packet Scheduling", Networking for Pervasive Computing, NIST Special Publication 500-259, pp. 73-79.
Golmie et al., "Bluetooth and WLAN Coexistence: Challenges and Solutions", Networking for Pervasive Computing, NIST Special Publication 500-259, pp. 116-123.
3$^{rd}$ Generation Partnership Project; Technical Specification Group Radio Access Network; Evolved Universal Terrestrial Radio Access (E-UTRA); Radio Resource Control (RRC); Protocol specification (Release 10); Technical Specification, 3GPP TS 36.331 v10.5.0 (Mar. 2012), 301 pages.
3$^{rd}$ Generation Partnership Project; Technical Specification Group Radio Access Network; Evolved Universal Terrestrial Radio Access (E-UTRA); Medium Access Control (MAC); protocol specification (Release 10); 3GPP TS 36.321 v10.5.0 (Mar. 2012), 54 pages.
Authorized Officer Theresia Van Deursen, Notification of Transmittal of the International Search Report and the Written Opinion of the International Searching Authority, International Application No. PCT/IB2014/000471, dated Jul. 10, 2014, 14 pages.
Japanese Patent Application No. 2016-504770, Notification of Reasons for Refusal, dated Mar. 30, 2018, 5 pages.

* cited by examiner

TERMINATION OF WIRELESS COMMUNICATION UPLINK PERIODS TO FACILITATE RECEPTION OF OTHER WIRELESS COMMUNICATIONS

CROSS REFERENCE TO RELATED APPLICATIONS

This application is a continuation of and claims the benefit of the priority of U.S. patent application Ser. No. 14/242,674, filed Apr. 1, 2014, which claims the benefit of the priority of U.S. Provisional Application Ser. No. 61/807,149, filed Apr. 1, 2013 and entitled "PUNCTURE OF INTERFERING UL SUBFRAMES TO FACILITATE IDC", which are incorporated herein by reference in their entirety.

BACKGROUND

The present disclosure describes systems and techniques relating to wireless communications by devices that employ more than one wireless communication technology.

Wireless communication devices can use one or more wireless communication technologies, such as code division multiple access (CDMA), orthogonal frequency division multiplexing (OFDM), single carrier frequency division multiple access (SC-FDMA), and time division synchronous code division multiple access (TD-SCDMA). Other examples of wireless technologies include WCDMA (Wideband Code Division Multiple Access), CDMA2000, UMTS (Universal Mobile Telecommunications System), GSM (Global System for Mobile communications), High Speed Packet Access (HSPA), WiMAX (Worldwide Interoperability for Microwave Access), LTE (Long-Term Evolution, often referred to as 4G), WiFi (wireless local area network standards), and Bluetooth (BT). Various examples of wireless communication devices include mobile phones, smartphones, wireless routers, wireless hubs, base stations, and access points. In some cases, wireless communication electronics are integrated with data processing equipment such as laptops, personal digital assistants, and computers.

A wireless device (or the portion of the device that provides end-to-end communications) is often referred to as user equipment (UE) in UMTS and 3GPP LTE. In some wireless networks, each wireless device synchronizes with one or more base stations, such as an evolved Node B (eNB), for wireless communications between the device and the station. In addition to the user data communicated in such networks, network management data is also communicated, which includes both downlink (DL) and uplink (UL) control information. For example, LTE uses uplink control information (UCI) and the hybrid automatic repeat request (HARQ) retransmission protocol.

In HARQ, error correction bits, such as forward error correction (FEC) bits, are included in a data transmission. When a message is received, error detection information can be used to identify success or failure for decoding of the message. The wireless communication device can send an acknowledgement (ACK) or a negative acknowledgement (NACK) based on the success or failure of the decoding. This lets the transmitter of the message know whether the message was received successfully or should be retransmitted. The message can be retransmitted as many times as necessary, but in typical wireless networks there will be a limit placed on the number of attempted retransmissions.

In addition, a typical wireless device will implement two or more wireless technologies and so have radios that need to coexist with each other in the same device. For example, LTE UE may coexist with other radios in a device, which is noted in LTE as in-device coexistence (IDC). Other radios' receiving performance may be significantly degraded by LTE uplink transmission from UE if the operating bands of LTE and the other radios are too close. Examples are the ISM (Industrial Scientific and Medical) band at 2400-2480 MHz (for BT and WiFi) and the LTE band 40 at 2300~2400 MHz. Thus, some coordination between LTE and other radios is desired so the LTE UE can stop transmission while another radio is receiving important information.

Current approaches to such coordination include: (1) the use of guard bands and filtering, such that LTE UE transmission and other radios' reception can happen at the same time; (2) priority-based puncture, where a device controller punctures LTE uplink subframes (i.e., gives up LTE uplink transmission) when there is some critical information that must be received by other radios; (3) scheduled puncture, where a more advanced eNB can inform LTE UE which uplink subframes are not scheduled to transmit information; and (4) random puncture, where a device controller randomly punctures uplink subframes, and allows other radios to receive in these subframes. Further, it has been suggested that coexistence of wireless technologies, such as LTE with BT, would benefit from alignment of subframe and slot boundaries of the respective wireless technologies.

SUMMARY

The present disclosure describes systems and techniques relating to wireless communications. According to an aspect of the described systems and techniques, a device includes: a first radio configured to communicate wirelessly with a first station in accordance with a first wireless communication technology, a second radio configured to communicate wirelessly with a second station in accordance with a second wireless communication technology, a controller configured to (i) terminate scheduled portions of time for sending communications from the first radio to the first station in favor of receiving communications from the second station to the second radio and (ii) restrict which of all available scheduled portions of time for sending communications from the first radio to the first station are provided for termination based on information about types of data transmitted in respective ones of the available scheduled portions of time.

The information used by the device can include hybrid automatic repeat request (HARQ) processes and uplink control information (UCI). The controller can be configured to restrict the scheduled portions of time available for termination by, without cooperation from the first station, not using all retransmission opportunities in a retransmission request protocol between the device and the first station using the first radio. In addition, the controller can be configured to restrict the scheduled portions of time available for termination based on HARQ processes.

The first wireless communication technology can be an LTE (Long-Term Evolution) wireless communication technology. The available scheduled portions of time can be subframes. The controller can be configured to restrict uplink subframes made available for puncture to evenly distribute puncture of the uplink subframes among different HARQ processes. Moreover, the device can include a memory, wherein the controller is configured to restrict uplink subframes made available for puncture based on results stored in the memory, the results being of a prior off-line search for puncture patterns based on HARQ processes.

The information used by the device can include uplink control information (UCI), and the controller can be configured to restrict the scheduled portions of time available for termination based on the UCI to reduce downlink performance degradation of communications from the first station to the first radio. Further, the controller can be configured to exclude periods from the scheduled portions of time made available for termination in favor of receiving communications from the second station to the second radio, wherein the excluded periods include all periods scheduled for transmission of acknowledgements (ACKs) from the first radio to the first station and at least a portion of periods scheduled for transmission of channel state information (CSI).

According to another aspect of the described systems and techniques, a method performed for two or more radios coexisting in a single communications device includes: sending, by the single device using a first radio of the two or more radios, data in uplink periods designated for the first radio communicating with a first station; determining, based on uplink control information for the first radio, a proper subset of uplink periods designated for the first radio communicating with the first station; favoring puncture of the proper subset of uplink periods over remaining uplink periods designated for the first radio communicating with the first station; selecting, by the single device, one or more of the proper subset of uplink periods for puncture; and receiving, by the single device using a second radio of the two or more radios, data from a second station during the one or more punctured uplink periods.

The determining can include determining the proper subset based at least in part on retransmission request processes. The determining can include autonomously, by the single device, not using all retransmission opportunities in a retransmission request protocol between the single device and the first station using the first radio. Further, the uplink periods can be uplink subframes, and the favoring can include evenly distributing puncture of the uplink subframes among different hybrid automatic repeat request (HARQ) processes.

The determining can include retrieving the proper subset, which is a result of off-line searching for puncture patterns based on hybrid automatic repeat request (HARQ) processes, and the favoring can include making only uplink periods in the proper subset available for puncture. The favoring can include reducing downlink performance degradation of communications from the first station to the first radio resulting from puncture of uplink periods. Moreover, the favoring can include excluding from being available for puncture (i) all uplink periods used for acknowledgements (ACKs) from the first radio to the first station, and (ii) at least a portion of uplink periods used for channel state information (CSI).

According to another aspect of the described systems and techniques, a system includes: a base station configured to wirelessly communicate with a first set of mobile devices, including a given mobile device; an access point configured to wirelessly communicate with a second set of mobile devices, including the given mobile device; and the given mobile device including coexisting radios configured to communicate with the base station and the access point using respective, different wireless communication technologies, and means for restricting which uplink periods used between the given mobile device and the base station are available for puncture, in favor of reception from the access point, based on information about types of data transmitted in respective ones of the uplink periods used between the given mobile device and the base station. The information can include hybrid automatic repeat request (HARQ) processes and uplink control information (UCI), and the wireless communication technologies can be an LTE (Long-Term Evolution) wireless communication technology and a Bluetooth (or other) wireless communication technology, respectively.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in one or more of the following advantages. Protection from interference between two wireless radios (e.g., interference between LTE UE UL transmission signals and WiFi reception) can be implemented with less cost. The described systems and techniques can be much less expensive than the use of guard bands and filtering, which may not be completely within the wireless device's control. In some cases, no upgrades are needed as the wireless stations (e.g., LTE eNB and WiFi access point) since the protection can be implemented autonomously by the wireless device communicating with such stations. While communications with one of the stations (e.g., LTE eNB) may be degraded, a complete receiving failure at the station (e.g., LTE eNB) is avoided. Moreover, in some implementations, the described systems and techniques can be implemented in program code added to existing wireless devices, without requiring changes in hardware.

Details of one or more implementations are set forth in the accompanying drawings and the description below. Other features and advantages may be apparent from the description and drawings, and from the claims.

DETAILED DESCRIPTION

Figure 1A:
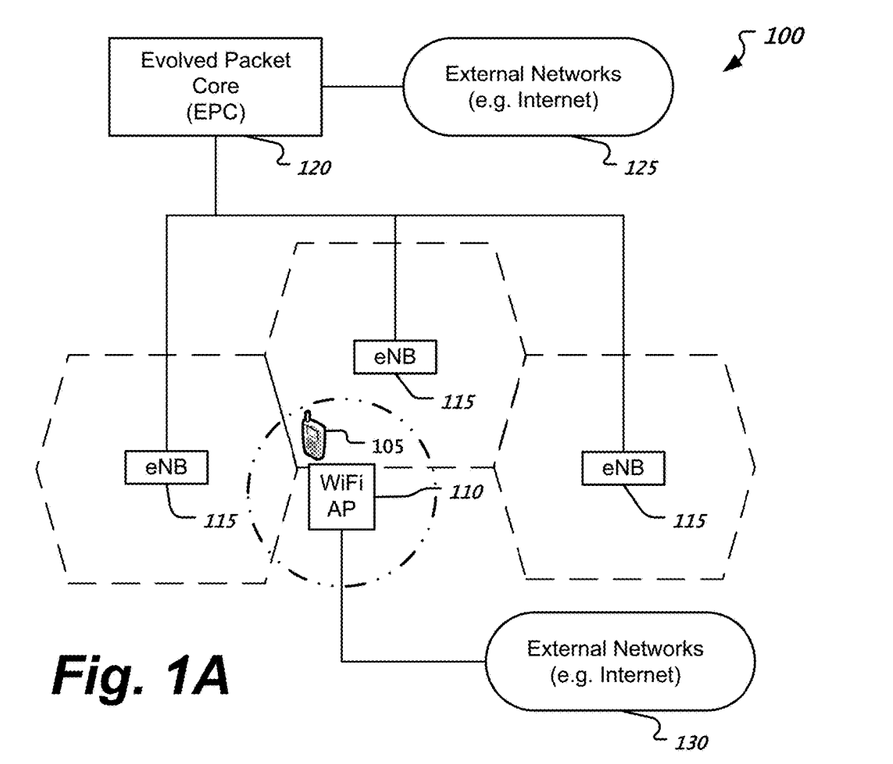
FIG. 1A shows an example of a wireless communication system.

FIG. 1A shows an example of a wireless communication system 100. In this example, only two specific examples of wireless technologies are discussed: LTE and WiFi. However, as will be appreciated, other wireless technologies can be added to the system 100, such as other mobile communication technologies (MCT), Bluetooth (BT) and Near Field Communication (NFC) technologies. Likewise, other wireless technologies can replace those described in the system 100, such as replacing LTE with other MCT (e.g., HSPA, HSPA, WCDMA, CDMA2000, UMTS, GSM, etc.) and replacing WiFi with other wireless local area network (WLAN) technologies.

The wireless communication system 100 can include one or more cellular networks made up of a number of radio cells, or cells that are each served by a base station, such as evolved Node B (eNB) base stations 115. The cells are used to cover different areas in order to provide radio coverage over a wide area. Wireless communication devices operate in the cellular radio coverage areas that are served by the base stations, such as a device 105. The wireless communication system 100 shown in FIG. 1A includes three base stations 115 (other numbers of base stations are of course possible) included in a radio access network (RAN) that is known as an evolved UMTS Terrestrial Radio Access Network (eUTRAN). In the LTE example of FIG. 1A, the base stations are shown as eNB base stations 115, and the eUTRAN includes the eNB base stations 115.

A base station 115 can operate in a mobile environment such as a femto-cell, pico-cell, or the base station 115 can operate as a node that can relay signals for other mobile and/or base stations. Base stations 115 can provide wireless services to one or more wireless communication devices 105. Base stations 115 can communicate with each other and with a core network called an evolved packet core (EPC) 120. The EPC 120 can provide wireless communication devices with access to one or more external networks 125, such as the Internet. The EPC 120 can include a mobility management entity (MME). The MME can be the main control element in the EPC 120 responsible for the functionalities, such as the control plane functions related to subscriber and session management.

The eNB base stations 115 communicate directly with the wireless device 105. The wireless device 105 can be a cellular phone, personal digital assistant (PDA), smartphone, laptop, tablet computer, or other wireless communications device. Further, wireless devices 105 can include pagers, portable computers, Session Initiation Protocol (SIP) phones, one or more hardware-based processors within devices, or any other suitable processing devices capable of communicating information using a radio technology. The wireless device 105 can communicate directly with a serving base station to receive service when the wireless device 105 is operated within the cell associated with the corresponding serving station. Wireless device 105 can also receive radio signals from base stations neighboring the serving base station. Once a wireless connection is established, the wireless device 105 generates requests and responses, or otherwise communicates with the EPC 120 and the external network 125 via one or more eNB base stations 115.

Before a wireless connection can be established, the wireless device 105 should detect the presence of a base station 115. Each base station 115 sends out one or more corresponding synchronization signals, which may be detected by the wireless device 105, depending on distance, channel conditions, and the processing activity of the wireless device 105. Once the synchronization signals are detected, the wireless device 105 can engage in synchronous communication with a base station 115, where downlink (from the base station 115 to the wireless device 105) and uplink (from the wireless device 105 to the base station 115) communications are transmitted during portions of time that are scheduled for those communications. For example, in LTE, the scheduled portions include frames and subframes.

The wireless device 105 can receive radio frequency (RF) signals across many frequency bands, some of which can interfere with each other. For example, the wireless device 105 can also receive RF signals from another wireless station using a different wireless technology, such as a WiFi access point (AP) 110. The WiFi AP 110 provides access to a local area network in the vicinity of the wireless device 105 and can also provide access to one or more external networks 130, such as the Internet, which can include some or all of the one or more external networks 125. Moreover, when there is potential interference between the two or more wireless communications supported by the wireless device 105, the wireless device 105 can mitigate such interference using the systems and techniques described in this disclosure.

Figure 1B:
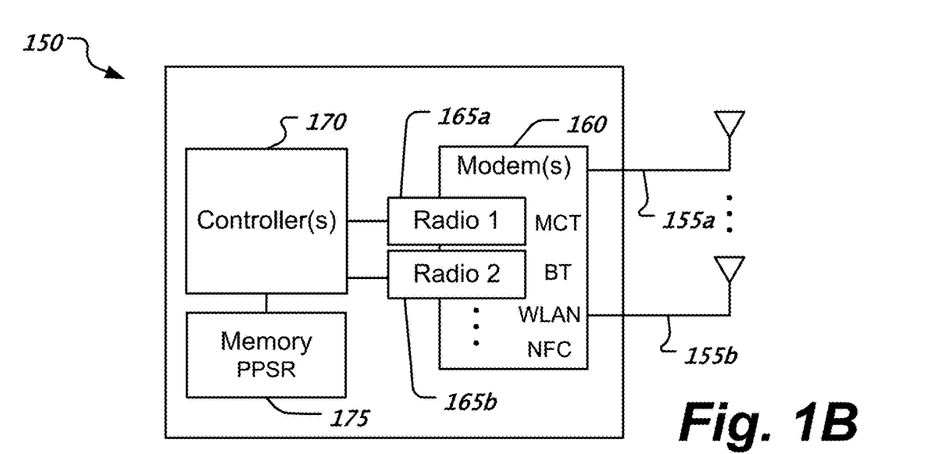
FIG. 1B shows an example of processing hardware for user equipment in a wireless communication network.

FIG. 1B shows an example of processing hardware for user equipment 150 in a wireless communication network. The user equipment 150 can be the wireless device 105 from FIG. 1A and includes transceiver electronics and processor electronics, such as one or more hardware processors, which can include one or more integrated circuit (IC) devices, that implement the systems and techniques presented in this disclosure. These electronics can also include one or more of each of the following: filters, amplifiers, frequency down-converters, and analog-to-digital converters. The transceiver electronics send and receive wireless signals over one or more antennas 155a, 155b. In addition, the transceiver electronics include two or more radio units.

These radio units can be implemented using one or more modems 160 and one or more controllers 170. As shown in FIG. 1B, the distinct radio units are represented as radio 165a and radio 165b. In some implementations, a radio unit includes a baseband unit (BBU) and a radio frequency unit (RFU) to transmit and receive signals. Moreover, in some implementations, the one or more controllers 170 include one or more processors, which are general purpose programmable hardware, specific purpose programmable hardware, or both. Thus, the user equipment 150 can also include memory 175, which can include one or more different memory devices, and which is configured to store information such as data and/or instructions. In some implementations, the one or more processors can include microprocessor units and embedded program code (e.g., firmware) that effects the techniques described in this disclosure.

In some implementations, user equipment 150 includes dedicated circuitry for transmitting and dedicated circuitry for receiving. The radios 165a, 165b can share the antennas 155a, 155b; or the radios 165a, 165b can each have one or more antennas 155a, 155b dedicated for its use. The user equipment 150 can be configured for various wireless communication techniques such as single-input single-output (SISO), multi-input multi-output (MIMO), bit-level combining, and symbol-level combining. A MIMO-based wireless communication device can transmit and receive multiple spatial streams over multiple antennas in each of the tones of an OFDM signal. Moreover, the user equipment 150 can be referred to as a "transmitter", a "receiver", or a "transceiver", as it both transmits and receives signals.

The radios 165a, 165b ("Radio 1" and "Radio 2" in FIG. 1B) use different wireless communication technologies that can interfere with other. These different wireless communication technologies can include various MCT (e.g., LTE), BT, WLAN (e.g., the Institute of Electrical and Electronics Engineers (IEEE) 802.11 family of standards), and NFC technologies. The controller(s) 170 can terminate (e.g., puncture) scheduled portions of time (e.g., subframes) for sending signal communications on the first radio 165a (e.g., an LTE radio) in favor of receiving signal communications on the second radio 165b (e.g., a WLAN or BT radio).

In addition, the controller(s) 170 can restrict which of all available scheduled portions of time for sending signal communications on the first radio 165a are provided for termination based on information about types of data transmitted in respective ones of the available scheduled portions of time. For example, in some implementations, the memory 175 can store puncture pattern search results (PPSR) from a prior off-line search for patterns based on HARQ processes, and the controller(s) 170 can restrict uplink subframes made available for puncture based on the PPSR stored in the memory 175. Moreover, in some implementations, the second radio 165b (e.g., a WLAN or BT radio) can stop or expect a damaged receiving if the first radio 165a (e.g., an LTE radio) has high priority data to send.

Figure 2A:
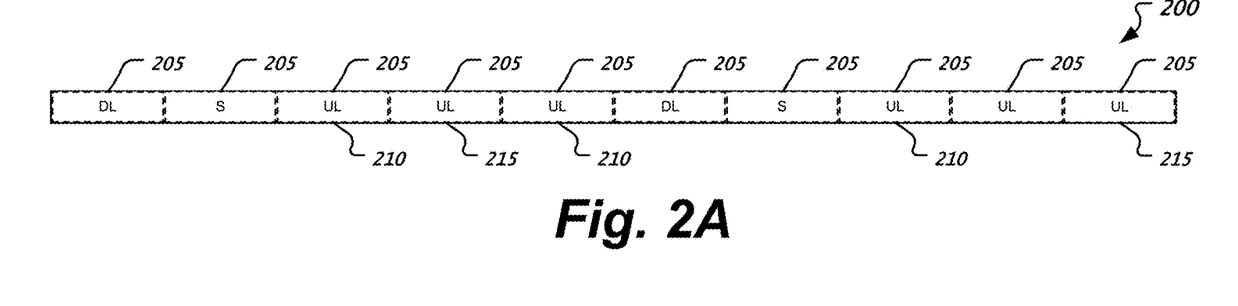
FIG. 2A shows an example of a wireless communication frame.

FIG. 2A shows an example of a wireless communication frame 200. In this example, the frame 200 is an LTE TDD (Time Division Duplex) frame structure frame with ten subframes 205. This frame structure 200 is the UL-DL configuration 0, where the S subframes provide the transition from a DL subframe to a UL subframe and include three parts: DwPTS (downlink portion), guard period, and UpPTS (uplink portion). In some implementations, the both the UL subframes and the uplink portion of the S subframes are made available for possible puncture. Note that this format is shown as an example only, as the described systems and techniques can be implemented with LTE FDD (Frequency Division Duplex), as well as other types of frames, subframes, slots, and other types of portions of time or periods scheduled for transmissions. Regardless of the particular format, a portion 210 of the subframes 205 can be made available for possible puncture. For example, the punctureable subframes 210 can be determined based on HARQ processes and uplink control information (UCI). In addition, the determination of which subframes to puncture can be based on both prior processing (e.g., the off-line search for patterns) and active processing performed during wireless communication.

Further, the determined punctureable subframes 210 may be favored for puncture by increasing the chances they will be punctured by the wireless device rather than other subframes, or by making the determined punctureable subframes 210 the only subframes 205 that are available for puncture. In some implementations, punctureable subframes 210 are determined, and non-punctureable subframes 215 are also determined. For example, the non-punctureable subframes 215 can be those scheduled for transmission of channel state information (CSI) and acknowledgement (ACKs). Failure to send these types of transmissions on the uplink to the wireless station can cause excessive degradation of performance on the downlink from the wireless station, and so puncture of these subframes should be avoided. In contrast, NACKs from the wireless device can be punctured without significant consequence, as the wireless station will most often send the non-decoded message again when neither an ACK nor a NACK are received. Thus, instead of puncturing UL subframes only based on if these subframes interfere with other coexisted radios, some information about the data transmitted in these subframes can be utilized to minimize the performance degradation on the LTE side.

Figure 2B:
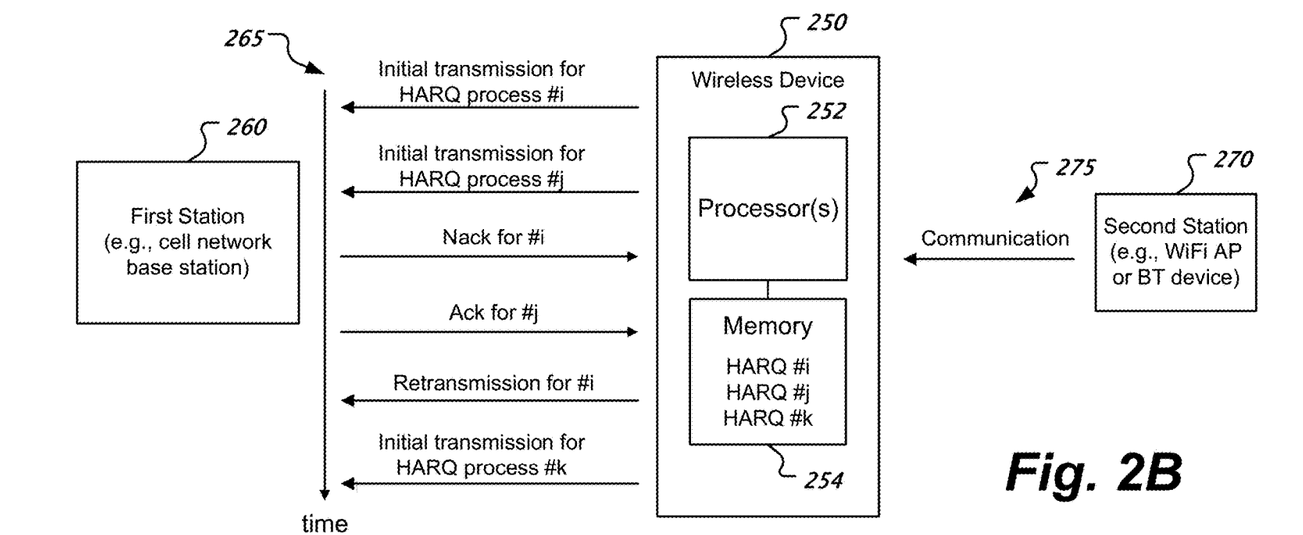
FIG. 2B shows an example of wireless communication transmissions between a wireless device and two wireless stations.

FIG. 2B shows an example of wireless communication transmissions between a wireless device 250 and two wireless stations 260, 270. The wireless device 250 includes one or more processors 252 and memory 254, which can be used to keep track of HARQ processes. In this example, the wireless device 250 uses HARQ for retransmission. However, other retransmission request protocols can be used.

HARQ is designed to ensure correct reception by retransmission of transport blocks (i.e., data packets) that have been transmitted but erroneously received. Acknowledgement (ACK) or negative acknowledgement (NACK) signaling from the receiver to the transmitter provides notification of whether or not the reception was successful. In the example shown in FIG. 2B, the first station 260 (e.g., a cell network base station) exchanges wireless communications 265 with the wireless device 250, and HARQ processing is used to keep track of which transmissions are successful and which need to be retransmitted.

An initial transmission for HARQ process #i is sent from the device 250 to the station 260. The HARQ process number can be tracked by packet or time, and multiple numbers of HARQ processes can be tracked. Thus, an initial transmission for HARQ process #j is also sent from the device 250 to the station 260 before any ACK or NACK is received for process #i. Each different HARQ process number can have different time of transmission and reception scheduling and can have different content (e.g., a Hypertext Transfer Protocol (HTTP) communication or a Voice Over Internet Protocol (VOIP) communication) or the same content, (e.g., a large packet that has been broken up into pieces).

In the example shown, the station 260 doesn't successfully receive process #i, but does successfully receive process #j. Thus, the station 260 sends a NACK for process #i and an ACK for process #j. If the device 250 successfully receives both the ACK and the NACK, the device 250 will send a retransmission for process #i, and the device 250 will schedule a new transmission for different data using HARQ process #j. Of course, other HARQ processes can also be scheduled, such as an initial transmission for HARQ process #k.

The wireless device 250 will have records showing what data will be transmitted in which subframes, including for example, the different HARQ processes for LTE UL subframes. This information can be used to determine which HARQ processes data can be thrown away, in favor of receiving a communication 275 from the second wireless station 270 (e.g., WiFi AP and/or BT device), without significant consequence. In addition to the HARQ processes relating to uplink data being transmitted from the wireless device 250 to the first station 260, there are also HARQ processes relating to downlink data being transmitted from the first station 260 to the wireless device 250. Looking at FIG. 2B, this situation can be visualized by reversing the directions of the wireless communications exchanges 265 (with time still running in the same direction). In such a situation, as noted above, for process #i, sending of the NACK (from the wireless device 250 to the first station 260) may be treated as unnecessary since the station 260 will likely send the retransmission for process #i when neither an ACK nor a NACK is received for that HARQ process.

An LTE UE modem has chances to retransmit data for each HARQ process if eNB does not decode correctly what the UE transmitted. Without cooperation from eNB, the LTE UE can take advantage of this retransmission and autonomously not use all the opportunities, i.e., drop some UL subframe transmission from the same HARQ process. This allows other radios to receive in such subframes if these subframes are the only reception chances for other radios. Although this UE autonomous method can cause UL throughput to decrease, it is an inexpensive solution for addressing the issue of interference between coexisted radios in a wireless device.

In addition, it may be desirable to distribute the UL dropping into different HARQ retransmissions/processes. Since UL transmission is synchronous, which subframe belongs to which HARQ process is known beforehand. The wireless device 250 will have records indicating when to transmit for a given HARQ process, in which downlink subframe the ACK/NACK from the first station 260 should be received, and if a NACK is received, which next subframe should be used to retransmit the UL data. Using this information, puncture of UL subframes evenly among different HARQ processes can be implemented. In other words, the puncturing can be distributed across retransmission processes, which may thereby distributed the puncturing across different data sets being sent from device 250 to station 260.

In addition, for a given coexistence implementation, off-line extensive search can be used to find puncture patterns based on HARQ processes. A base puncture pattern for which subframes to puncture can be determined before the wireless device 250 starts working. The off-line search can be used to find the optimum pattern based on the application scenario. Note that the coexistence of radios might have different application scenarios in various implementations. For example, LTE UE in the wireless device 250 might receive voice data from an LTE base station 260, and then BT UE in the wireless device 250 might use BT headphones 270 to provide hands free operation of the wireless device 250. As another example, LTE UE in the wireless device 250 might receive voice data from an LTE base station 260 while also downloading data via a WiFi AP 270.

Based on different application scenarios, a search can be done to find the best, different starting puncture patterns for each respective application scenario. For example, for a first application, it may be determined that one or two out of a fixed number of subframes are puncturable, but the rest subframes are not; whereas for another application, it may be determined that only the first subframe of each frame is puncturable. In addition, the puncture patterns can vary with the type of the second radio at issue. For example, with LTE and BT, it may be preferable to give BT a near 100% change of receiving its data, and so a HARQ pattern can be determined for this, but then the wireless device could back off from keeping reception perfect for BT, as needed based on operating conditions.

Results of such puncture pattern searching can be stored in memory 254 for use by the wireless device 250 during operation. Note that the best puncture patterns can occur when timing offset between LTE and coexisted radios are within certain ranges. However, accurate time synchronization and/or frame alignment between different radios may not be necessary. For example, BT and LTE have different clock rates, BT has slots whereas LTE has subframes, and the duration of these are different. Thus, the BT slot boundary and the LTE subframe boundary may not align perfectly together. Nonetheless, it has been found that even when the scheduled time portions of the respective different radios are not aligned, puncture patterns that work can be identified. Moreover, some of the best puncture patterns can happen without perfect alignment. For example, the offset between the scheduled time portions of the respective different radios may be 0.3 ms, and in this case the puncture rate for LTE might be the smallest one.

Figure 3A:
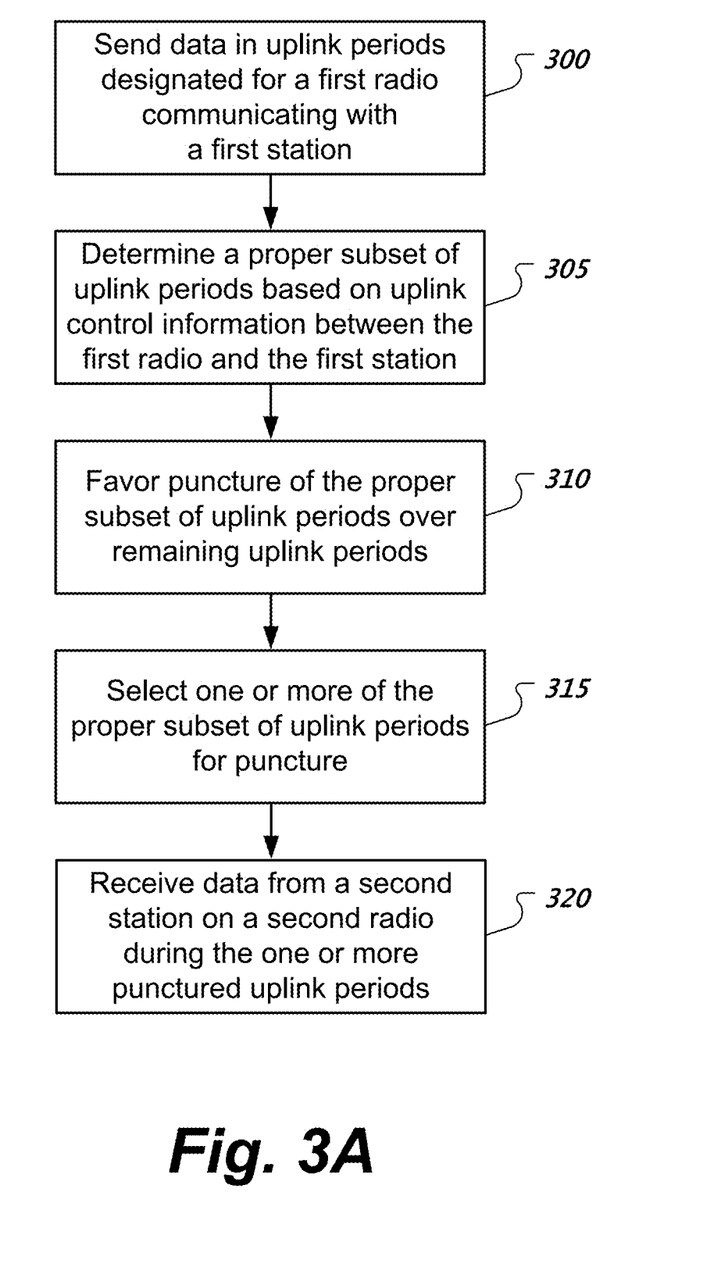
FIG. 3A is a flowchart showing an example of uplink period puncture for first-type wireless communications in favor of second-type wireless communications.

FIG. 3A is a flowchart showing an example of uplink period puncture for first-type wireless communications (e.g., LTE communications) in favor of second-type wireless communications (e.g., WiFi or BT communications). At 300, a single device, which includes two or more coexisting radios, sends data (using a first radio of the two or more radios) in uplink periods (e.g., LTE subframes) designated for the first radio communicating with a first station. This data can include user data (e.g., voice data sent to an LTE base station), control data (e.g., LTE channel state information), or both.

At 305, a proper subset of uplink periods designated for the first radio communicating with the first station can be determined based on HARQ processes information and uplink control information (UCI). The UCI can include channel state information (CSI) and ACK/NACK information. In some implementation, this determination can be based on retransmission request processes, such as HARQ processes, generally. In some implementation, this determination can be performed in advance of the sending of data by the operating device, such as by an off-line search performed to find one or more proper subsets (e.g., puncture patterns) for one or more application scenarios.

At 310, puncture of the proper subset of uplink periods is favored over remaining uplink periods designated for the first radio communicating with the first station. This can involve increasing the likelihood that the uplink periods in the proper subset will be punctured over the remaining uplink periods, but the remaining uplink periods (or at least some of them) may still be punctured. Thus, the uplink periods can be placed into multiple groups for different treatment with respect to puncture (e.g., a first group that is preferred for puncture, a second group that may be punctured, and a third group that may not be punctured). Alternatively, this favoring of the proper subset can involve making only uplink periods in the proper subset available for puncture. Moreover, the favoring at 310 can involve evenly distributing puncture of the uplink periods among different processes (e.g., different HARQ processes).

At 315, one or more of the proper subset of uplink periods are selected for puncture. This selection can be governed by various factors in various implementations. For example, the selection can be based on priority information relating to the wireless communications, such as selecting uplink periods from the proper subset to puncture when there is some critical information that must be received by a second radio of the two or more radios in the single device. As another example, uplink periods from the proper subset can be randomly punctured to allow the second radio to receive in these periods. Moreover, the number of uplink periods to puncture can be varied based on information regarding the nature of the wireless communications with the first radio and the nature of the wireless communications with the second radio.

In some implementations, the two or more of the determining at 305, the favoring at 310, and the selecting at 315 can be merged into a single operation. These and other systems and methods described herein can be generally understood as algorithmic implementations for restricting which of the uplink periods used between the single device (e.g., a smartphone) and the first station (e.g., an LTE base station) are available for puncture, in favor of reception from a second station (e.g., a WiFi AP), based on information about types of data transmitted in respective ones of the uplink periods used between the single device and the first station.

In some implementations, the single device can restrict the uplink periods that are available for puncture by, without cooperation from the first station, not using all retransmission opportunities in a retransmission request protocol between the device and the first station using the first radio. In some implementations, the single device can restrict the uplink periods that are available for puncture to evenly distribute puncture of the uplink subframes among different HARQ processes. In some implementations, the single device can restrict the uplink periods that are available for puncture based on UCI to reduce downlink performance degradation of communications from the first station to the first radio. In any case, at 320, data is received from a second station using the second radio during the one or more punctured uplink periods.

Figure 3B:
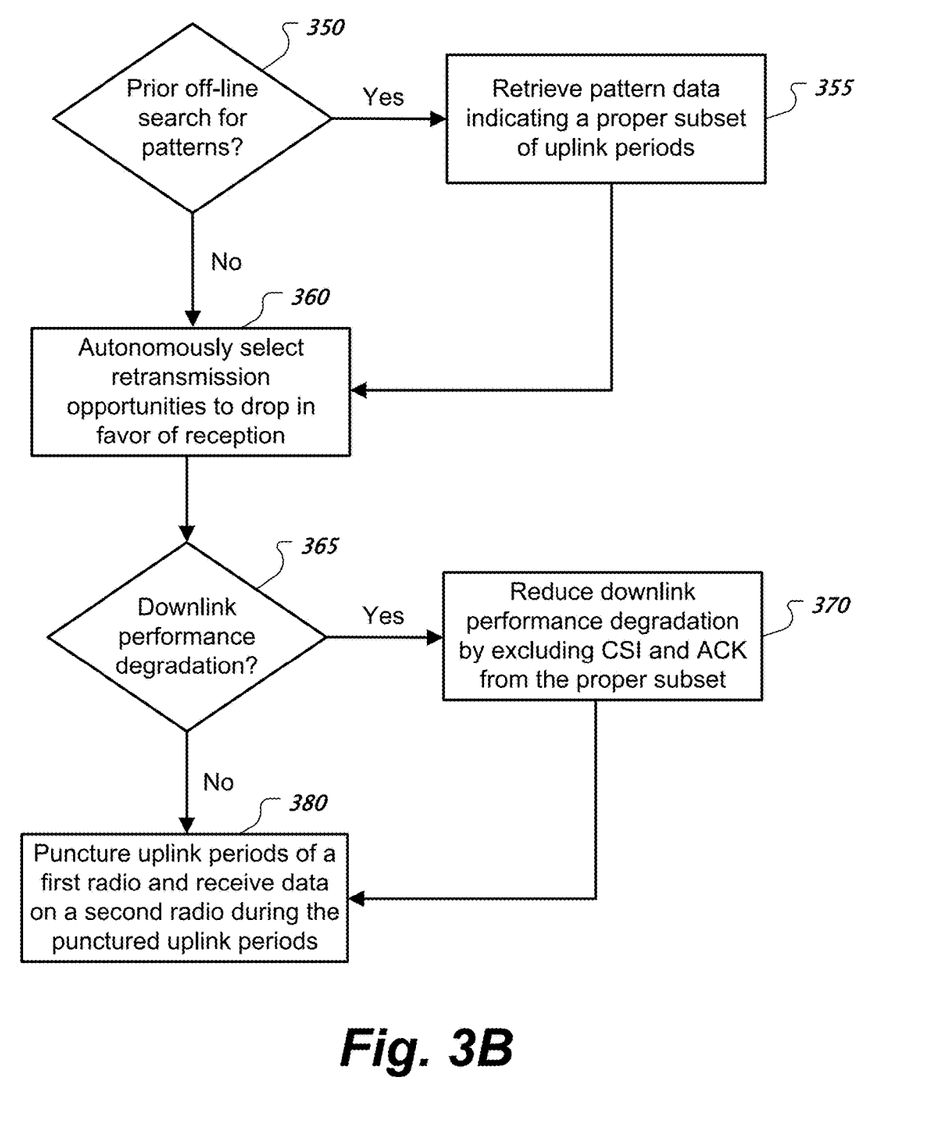
FIG. 3B is a flowchart showing an example of restricting uplink periods made available for puncture.

FIG. 3B is a flowchart showing an example of restricting uplink periods made available for puncture. At 350, a check can be made for any prior off-line search results for patterns to be used in uplink period puncture. These patterns can be based on HARQ processes, as noted above. At 355, such pattern data, which indicates a proper subset of uplink periods, can be retrieved for use in the on-line operations of the device.

At 360, the single device autonomously selects first radio retransmission opportunities to drop in favor of reception on the second radio. By not using all retransmission opportunities in a retransmission request protocol (e.g., HARQ) between the single device and the first station using the first radio, performance for the first radio is degraded slightly in favor of reception on the second radio.

At 365, a check can be made regarding any potential downlink performance degradation caused by uplink period puncture. This can be done during a previous off-line search or actively during wireless device operation. At 370, such downlink performance degradation can be reduced by excluding uplink periods used for CSI and ACK messages from the proper subset of uplink periods available for puncture. This UCI is important for downlink performance and should not be dropped. However, some other UCI (e.g., NACK) that is related to downlink receiving need not be transmitted, and this non-transmission should not have a significant impact on downlink performance. Finally, at 380, uplink periods of the first radio are punctured, and data is received on the second radio during the punctured uplink periods.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:
1. A device comprising:
a first radio comprising first transceiver electronics configured to wirelessly transmit to a first station in accordance with a first wireless communication technology via uplink periods that are scheduled by the first station;

a second radio comprising second transceiver electronics configured to wirelessly communicate with a second station in accordance with a second wireless communication technology; and a controller coupled with the first radio and the second radio, wherein the controller is configured to select for puncturing one or more of the uplink periods based on information about types of data to be transmitted respectively in the uplink periods, wherein the controller is configured to puncture, independently of the first station, the one or more selected uplink periods by causing the first radio to terminate transmissions to the first station during the one or more selected uplink periods, and cause the second radio to receive data from the second station during the one or more selected uplink periods;

wherein the information used to puncture one or more of the uplink periods comprises information about hybrid automatic repeat request (HARQ) processes, and wherein the uplink periods comprise uplink subframes;

wherein the controller is configured to restrict the uplink subframes available for puncture based on the HARQ processes; and wherein the controller is configured to restrict the uplink subframes made available for puncture based on results of a prior off-line search for puncture patterns performed based on the HARQ processes.

2. The device of claim 1, wherein the controller is configured to exclude uplink periods used for acknowledgements (ACKs) from the first radio to the first station from being selected for puncturing.

3. The device of claim 1, wherein the controller is configured to exclude one or more uplink periods used to transmit uplink control information (UCI) from the first radio to the first station from being selected for puncturing to reduce downlink performance degradation of communications from the first station to the first radio.

4. The device of claim 1, wherein the controller is configured to restrict the uplink periods available for puncture by, without cooperation from the first station, not using all retransmission opportunities in a retransmission request protocol between the device and the first station using the first radio.

5. The device of claim 1, wherein the controller is configured to restrict the uplink subframes made available for puncture to evenly distribute puncture of the uplink subframes among different ones of the HARQ processes.

6. A method comprising:
operating first transceiver electronics of a first radio of a device to wirelessly transmit to a first station in accordance with a first wireless communication technology via uplink periods that are scheduled by the first station;
operating second transceiver electronics of a second radio of the device to wirelessly communicate with a second station in accordance with a second wireless communication technology;
selecting one or more of the uplink periods for puncture based on information about types of data to be transmitted respectively in the uplink periods to the first station;
puncturing, independently of the first station, the one or more selected uplink periods by causing the first radio to terminate transmissions to the first station during the one or more selected uplink periods;
receiving, by the second radio, data from the second station during the one or more punctured uplink periods;

wherein the information used to puncture one or more of the uplink periods comprises information about hybrid automatic repeat request (HARQ) processes, wherein the uplink periods comprise uplink subframes, and wherein the selecting comprises restricting the uplink subframes available for puncture based on the HARQ processes; and wherein the selecting comprises restricting the uplink subframes made available for puncture based on results of a prior off-line search for puncture patterns performed based on the HARQ processes.

7. The method of claim 6, wherein the selecting comprises excluding uplink periods used for acknowledgements (ACKs) from the first radio to the first station from being selected for puncturing.

8. The method of claim 6, wherein the selecting comprises excluding one or more uplink periods used to transmit uplink control information (UCI) from the first radio to the first station from being selected for puncturing to reduce downlink performance degradation of communications from the first station to the first radio.

9. The method of claim 6, wherein the selecting comprises restricting the uplink periods available for puncture by, without cooperation from the first station, not using all retransmission opportunities in a retransmission request protocol between the device and the first station using the first radio.

10. The method of claim 6, wherein the selecting comprises evenly distributing puncture of the uplink subframes among different ones of the HARQ processes.

11. A system comprising:
coexisting radios, comprising first transceiver electronics of a first radio and second transceiver electronics of a second radio, configured to communicate with a base station and an access point using respective, different wireless communication technologies, the first radio being configured to wirelessly transmit to the base station via uplink subframes that are in accordance with a schedule controlled by the base station; and
a controller coupled with the coexisting radios, wherein the controller is configured to select for puncturing one or more of the uplink subframes based on information about types of data to be transmitted respectively in the uplink subframes, wherein the controller is configured to puncture, independently of the base station, the one or more selected uplink subframes by causing the first radio to terminate transmissions to the base station during the one or more selected uplink subframes, and cause the second radio to receive data from the access point during the one or more selected uplink subframes;
wherein the information used to puncture one or more of the uplink subframes comprises information about hybrid automatic repeat request (HARQ) processes, and wherein the controller is configured to restrict the uplink subframes available for puncture based on the HARQ processes; and
wherein the controller is configured to restrict the uplink subframes made available for puncture based on results of a prior off-line search for puncture patterns performed based on the HARQ processes.

12. The system of claim 11, wherein the controller is configured to exclude one or more uplink subframes used to transmit uplink control information (UCI) from the first radio to the base station from being selected for puncturing to reduce downlink performance degradation of communications from the base station to the first radio.

13. The system of claim 11, wherein the controller is configured to restrict the uplink subframes available for puncture by, without cooperation from the base station, not using all retransmission opportunities in a retransmission request protocol between the first radio and the base station.

14. The system of claim 11, wherein the controller is configured to restrict the uplink subframes made available for puncture to evenly distribute puncture of the uplink subframes among different ones of the HARQ processes.

* * * * *